Patented Jan. 9, 1951

2,537,190

UNITED STATES PATENT OFFICE 2,537,190

DISPERSIONS OF BITUMEN AND A RUBBER FOR USE AS ADHESIVES

Charles A. Lankau, Nanuet, N. Y., Robert E. Leeks, Allwood, N. J., and Clement L. Marino, Newburg, N. Y., assignors to The Patent and Licensing Corporation, New York, N. Y., a corporation of Massachusetts No Drawing. Application April 29, 1947, Serial No. 744,782

14 Claims. (Cl. 260—28.5)

This invention relates to dispersions of bitumen and synthetic rubber in an aqueous medium, which dispersions are particularly suitable for use as adhesives to bond felt or fabric to each other or to metal surfaces.

Adhesives of the emulsion or dispersion type employed, for example, in the automotive industry to bond fabric trunk liners to the metal walls of the vehicle trunk or to bond felt to vehicle bodies for vibration damping, heat insulation, or other purposes, must meet certain specifications. Thus they must have the following properties:

(a) Good tack and tack retention. By tack retention is meant that if the bond between the felt or fabric and metal breaks for any reason, the adhesive retains its tackiness to an extent sufficient to reform the bond when the felt or fabric is again brought into contact with the metal surface;

(b) Relatively high heat strength. By heat strength is meant that the adhesive retains its bonding properties at relatively high temperatures for a considerable period of time. This property is particularly important in the automotive industry because unless the adhesive is of high heat strength it will fail when the vehicle, after painting, is subjected to drying involving the passage of the painted vehicle through a drying oven maintained at a temperature of 180° to 200° F. and in some plants as high as 350° to 375° F.;

(c) Relatively stable, even when brought into contact with metals such as the metal containers in which they may be stored or transported and the pipe lines through which they are pumped for use. When sprayed, they should not break while in the spray gun since this would cause clogging of the gun. The stability should also be adequate to permit them to be applied by means of roller coaters;

(d) Relatively quick breaking when sprayed or rolled on to the metal surface to form an adhesive layer of film; and (e) Viscosity characteristics such that they may be readily applied to the desired surface, preferably by spraying. Instead of being sprayed on to the surface, particularly in the case of the more viscous dispersions, they may be applied by a coating roller. Dispersions applied by spraying must not "cobweb." Dispersions, which when sprayed thicken and become interconnected resembling a cobweb, it has been found, become dispersed in the atmosphere when sprayed, so that they cover other surfaces than the desired surface.

One method heretofore employed to produce a dispersion of rubber and bitumen having the desired properties, has been to blend the rubber and the asphalt and then disperse the resulting blend in a masticating machine such as the well known Werner-Pfleiderer mixer in the presence of a suitable dispersing agent. The rubber thus employed was reclaimed natural rubber. The masticating operation is laborious and time-consuming. Moreover, following this procedure it is not possible in view of the length of time required to masticate the rubber and asphalt mixture to operate continuously. Prior procedures for producing such dispersions have therefore involved the mastication of separate batches of asphalt-rubber mixes with consequent small production of material per unit of equipment and the other disadvantages inherent in batch operation, e. g., high labor and production costs.

Another method heretofore employed for producing a dispersion of rubber and bitumen having the desired properties has been to prepare a dispersion of the rubber and then mix this dispersion with a separately prepared dispersion of the bitumen. In such method the preparation of the rubber dispersion likewise requires that the rubber be masticated in a heavy duty type masticating machine such as a Werner-Pfleiderer mixer, and hence involves the same laborious, time-consuming and costly operation as in the case of the method first referred to. Moreover, the mixing of the thus prepared rubber dispersion with the separately prepared dispersion of the bitumen is an undesirable procedure, especially for large scale production, owing to the difficulties encountered in mixing the two rather dissimilar dispersions.

It has also been proposed to disperse bitumens, including petroleum asphalts by employing natural rubber latex as the emulsifying agent, by passing the latex and the bitumen through a colloid mill. Following this practice, it has not been possible to produce dispersions of rubber and bitumen having the above noted properties required for adhesives, particularly adhesives suitable for use in the automotive field. Nor has it been possible to produce a suitable dispersion containing a relatively high bitumen content, say one in which the amount of bitumen predominates over the amount of rubber present. Dispersions having low bitumen contents are usually lacking in tack; further, since rubber is considerably more costly than bitumen, such dispersions are undesirable from an economic standpoint.

We have made the surprising discovery that dispersions of synthetic rubber and bitumen in an aqueous medium having properties which render them eminently satisfactory for use as adhesives in the automotive and other industries in which felt or fabric are bonded to each other or to metal may be made by observing the following conditions:

(1) employ as the synthetic rubber constituent of the dispersions a dispersion of synthetic rubber produced by polymerizing the rubber monomer or other rubber forming reactants dispersed in an aqueous medium and in the presence of a soap dispersing agent, the synthetic rubber dispersion being diluted to contain from 18% to 55% by weight of solids and 45% to 82% by weight of water;

(2) employ as the bitumen constituent of the dispersions bitumen having a melting point of from 85° to 160° F. and a penetration of from 30 to 200;

(3) intimately mix the bitumen and the synthetic rubber dispersion in proportions to produce a product dispersion containing for each part by weight of synthetic rubber solids from 1 to 9 parts by weight of bitumen;

(4) mix the bitumen and the synthetic rubber dispersion in the presence of a dispersing agent, preferably soap, which agent is compatible with the soap dispersing agent present during the polymerization of the rubber monomer or other rubber forming reactants; a sufficient portion of this dispersing agent must be incorporated in the synthetic rubber dispersion prior to mixing of the latter with the bitumen in order to provide sufficient stability for dispersing the required amount of bitumen by means of the synthetic rubber dispersion and the added dispersing agent; the balance may, however, be added to the dispersion of synthetic rubber and bitumen after this dispersion has been formed, to produce the desired product dispersion;

(5) introduce the synthetic rubber dispersion into the mixing zone at a pH of from 10.5 to 14 and maintain the pH of the dispersion withdrawn from this zone within the range of 9 to 14 by adding alkali or alkaline soap thereto for this purpose; and (6) adjust, if necessary, the viscosity of the product dispersion by addition of water or dilute soap solution or a thickening agent so that it has a desired viscosity within the range of 100 to 150,000 centipoises. Preferred viscosity for a dispersion to be applied by spraying is from 100–350 centipoises. In the case of more viscous dispersions applied by a roller coating operation the viscosity may be as high as 150,000 centipoises.

Product dispersions made by observing the above noted conditions are stable even when brought into contact with bimetal systems such as galvanized pipe, can be sprayed, if desired, and when sprayed do not break in the spray gun but are quick breaking upon application to the desired surface to form an adhesive layer or film thereon, which layer or film has high tack and tack retention and high heat strength.

Moreover, we have found that these dispersions of synthetic rubber and bitumen can be produced continuously by feeding a stream of the dispersion of synthetic rubber in an aqueous medium and a stream of liquid bitumen through a mixing zone, such as a colloid mill or other equipment in which the bitumen is subjected to a shearing and tearing action and is caused to be dispersed in the aqueous phase of the synthetic rubber dispersion, the two streams being fed at a rate to produce in the final mix the proportions of synthetic rubber and bitumen hereinabove indicated, introducing the synthetic rubber dispersion stream into the mixing zone at a pH of from 10.5 to 14 by adding thereto alkali or soap for this purpose, if necessary, continuously withdrawing the dispersion from the mixing zone, and maintaining its pH from 9 to 14 by addition of alkali or soap thereto, if necessary. This continuous process permits large through-puts with consequent large production per unit of time and unit of equipment, thus resulting in substantial economies, particularly as compared with prior processes of masticating mixtures of rubber and asphalt to disperse the same or of making separate dispersions of rubber and of asphalt in aqueous medium involving the tedious and time-consuming mastication of rubber to disperse the same and the subsequent mixing of the resulting dispersion with the asphalt dispersion.

As the bitumen component of the product dispersion any bitumen having a melting point of 85° to 160° F. and a penetration of 30 to 200 may be used. The preferred bitumen is asphalt; coal tar pitch may be used if desired. Straight distilled asphalts and coal tar pitches or cut backs having melting points and penetrations within the range above indicated may be employed. In the production of light colored products albino type asphalts are preferably used. Thus, for example, a domestic soft albino asphalt having a melting point of 100° to 110° F. and a penetration of 120 to 140 has been found particularly suitable for the production of light colored product dispersions. Where a dark color is not objectionable, a steam-refined asphalt having a melting point of 110° to 120° F. and a penetration of 100 to 120 may be blended with an albino asphalt in any desired proportions. A blend which has been found particularly suitable for production of a sprayable dispersion for use in the automotive field consists of a mixture of 50 parts steam-refined asphalt and 50 parts domestic soft albino asphalt, both asphalts having the melting point and penetration values hereinabove noted.

The synthetic rubber dispersion may be a dispersion of any of the synthetic rubbers, which dispersion is produced by polymerizing the rubber forming reactants dispersed in an aqueous medium in the presence of soap emulsifying or dispersing agent, such as rosin soap or soaps made by saponifying coconut oil or other fatty acids. Such rubber dispersions are commonly referred to as synthetic rubber latices. Examples of such dispersions are dispersions of butadiene styrene copolymers (GR-S), polychloroprenes (known as neoprenes), butadiene acrylonitrile copolymers (known as Hycar), organic polysulfides including the reaction products of (a) ethylene dichloride and sodium tetrasulfide and (b) dichloroethylether and sodium tetrasulfide (which organic polysulfides are known as Thiokols). The preferred synthetic rubber dispersions are dispersions of butadiene styrene copolymers which are available commercially in four different concentrations, namely, 37%, 54%, 57% and 62.5% by weight of butadiene styrene copolymers based on the weight of the dispersion.

As above indicated the synthetic rubber dispersion and bitumen should be mixed in proportion to produce a product dispersion having from 1 to 9 parts of bitumen for each part of synthetic rubber solids. The preferred ratio of bitumen to synthetic rubber solids in the product dispersion is from 70 to 85 parts of the former to 15 to 30 parts of the latter.

A thickening and stabilizing agent may be added to the dispersion of synthetic rubber prior to mixing of the synthetic rubber dispersion with the bitumen, although, if desired, such thickening agent may be incorporated in the product dispersion consisting of the synthetic rubber and bitumen dispersed in an aqueous medium. Methyl cellulose (Methocel), the sodium salt of carboxy methyl cellulose, algin, casein, locust bean gum or hydroxy ethyl cellulose may be employed as the thickening and stabilizing agent. The amount of such agent added should be such that the product dispersion contains from .0025% to 1%, preferably from 0.1% to .3%, by weight of agent based on the weight of solids in the product dispersion.

As the emulsifying or dispersing agent incorporated in the dispersion, soap, such as sodium resinate or soap such as "Vinsol" soap made by reacting the black residue left after rosin is extracted with petroleum solvents with alkali may be employed. Instead of a soap dispersing agent, casein or alpha protein may be used. The amount of dispersing agent incorporated should be within the range of from .5% to 2.5% by weight of dispersing agent based on the weight of the product dispersion. A sufficient portion of the dispersing agent, namely an amount not less than 1% (by weight) based on the weight of the synthetic rubber dispersion is added to dispersion before the latter is mixed with the bitumen, and the remainder may be added to the mixture withdrawn from the mixing zone.

In producing the product dispersion of this invention the dispersion of synthetic rubber in an aqueous medium at room temperature is first mixed with the required amount of the soap dispersing agent. If a thickening agent is used, it may be added to the mixture of synthetic rubber dispersion and dispersing agent. The mixing may be carried out in any suitable mixer under atmospheric temperature conditions to produce a dispersion having a pH within the range of from 10.5 to 14 containing from 18% to 55% solids (synthetic rubber, soap, thickener and stabilizing agent, if present) and from 45% to 82% water. This dispersion is then heated to a temperature of 75° to 120° F. and at this temperature a stream of the synthetic rubber dispersion introduced into the colloid mill or other analogous mixer. A stream of the bitumen, preferably asphalt, in heat liquefied condition is concurrently introduced into this colloid mill at a temperature within the range of 240° to 280° F. and the resultant product continuously withdrawn from the colloid mill at a temperature of from 150° to 170° F. The mixing of the synthetic rubber dispersion with the bitumen, which is invariably acidic, produces a mixture having a lower pH than that of the synthetic rubber dispersion. The pH of the mixture, however, seldom falls below 9. If it does, alkali, preferably sodium or potassium hydroxide, or soap should be added to the mixture to be sure that its pH falls within the range of from 9 to 14. The viscosity of the dispersion withdrawn from the colloid mill is adjusted so that it has the desired viscosity within the range of from 100 to 150,000 centipoises. If thickening agent has been mixed with the synthetic rubber dispersion before mixing the latter with the bitumen in the colloid mill, the viscosity adjustment may be made by the addition of water or soap thus producing the desired product dispersion; otherwise the thickening agent may be incorporated in the dispersion withdrawn from the mill, in an amount to provide the desired viscosity.

To produce a product dispersion of exceptionally high heat strength a fortifier for the synthetic rubber, such as carbon black, may be incorporated in the dispersion. This is preferably accomplished by forming a dispersion of the carbon black or other fortifier in an aqueous medium and mixing this dispersion with the product dispersion in proportions such as to incorporate the desired amount of fortifier. The fortifier dispersion should be compatible with the synthetic rubber dispersion, i. e., it should not cause breaking of the synthetic rubber dispersion. From 10% to 50%, preferably from 30% to 40%, by weight of carbon black based on the weight of synthetic rubber present may thus be introduced into the product dispersion.

The following examples are illustrative of the process and product of this invention; it will be understood the invention is not limited to these examples.

*Example I*

A dispersion of butadiene styrene copolymers in an aqueous medium was made by mixing at room temperature 79.25 parts of aqueous dispersion of butadiene styrene copolymer containing 37% by weight of synthetic rubber solids with 13.10 parts of sodium B rosin soap of 24% soap concentration and 7.65 parts of a 5% solution of methyl cellulose having a viscosity of 25 centipoises. A stream of this dispersion at a temperature of 85° F. and having a pH of from 10.5 to 14 was fed to the colloid mill. Concurrently a stream of asphalt consisting of a blend of 50 parts soft domestic albino asphalt having a melting point of 100° to 110° F. and 50 parts of a steam-refined asphalt having a melting point of 100° F. was fed to the colloid mill at a temperature of 240°–250° F. 50.4 parts by weight of asphalt were fed to the colloid mill per 49.6 parts of synthetic rubber dispersion. The resultant dispersion was continuously withdrawn from the colloid mill and its viscosity adjusted by dilution with a 3% by weight concentration of sodium B rosin soap; 7.14 parts of this soap solution were mixed with 92.86 parts of dispersion. There was thus produced a product dispersion having the following percentage composition by weight:

| | |
|---|---|
| Asphalt | 46.8 |
| GR–S solids | 13.5 |
| Sodium B rosin soap | 1.66 |
| Methyl cellulose | .176 |
| Water | 37.864 |
| Ratio of asphalt to synthetic rubber | 77.5–22.5 |
| Viscosity _____centipoises__ | 310 |

This product was tested by the test procedure hereinafter described. The average of three heat strength tests showed the product to have a heat strength of 181.4° F. Its tack and tack retention were excellent. It was found to be stable in storage and have excellent spray characteristics and yet quick breaking upon contact with metal or other surface.

*Example II*

In this example a light colored product was produced by using a domestic soft albino asphalt having a melting point of 100° to 110° F. and a penetration of 120 to 140 instead of a blend of such soft albino asphalt and steam-refined asphalt as in Example I. The constituents were mixed in the following proportions, 1598 parts soft albino asphalt, 1247 parts of dispersion of butadiene styrene copolymer containing 37% by weight of synthetic rubber solids, 206 parts of 24% sodium B rosin soap, and 120 parts of 5% methyl cellulose having a viscosity of 25 centipoises, and 242 parts of 3% sodium B rosin soap; the latter constituent, as in the case of Example I, was added to the mixture withdrawn from the colloid mill to adjust its viscosity. Except as above noted, the procedure was substantially the same as in Example I.

The product dispersion was tested with the following results: Heat strength (average of three tests) 5 minutes at 127.4° F., tack and tack retention—excellent; deposition value .019, pH 11.6, sprayability, good; stable in storage, quick breaking on application to a surface, and color—light brown.

Example III

This example differs from Example I chiefly in that a fortifier was added. The synthetic rubber dispersion fed to the colloid mill consisted of 68 parts butadiene styrene copolymer containing 37% by weight of synthetic rubber solids, 18.5 parts of 24% sodium B rosin soap and 13.5 parts of a 5% solution of methyl cellulose having a viscosity of 25 centipoises. The blend of asphalt was the same as in Example I, the asphalt and synthetic rubber dispersion were fed to the colloid mill at the same temperatures as in Example I but in the proportion of 51.3 parts of the synthetic rubber dispersion containing the added soap and methyl cellulose, to 48.7 parts of asphalt. To the dispersion withdrawn from the colloid mill was added sodium B rosin soap to adjust its viscosity to 300 centipoises and fortifier, in the proportions of 82.49 parts of dispersion, 8.31 parts of 3% sodium B rosin soap and 9.20 parts of a 37% dispersion of carbon black. The resultant product dispersion had the following percentage composition by weight:

| | |
|---|---|
| Asphalt | 48.44 |
| GR-S solids | 8.60 |
| Sodium B rosin soap | 1.75 |
| Methyl cellulose | .228 |
| Carbon black solids | 3.45 |
| Water | 37.532 |
| Ratio of asphalt to synthetic rubber | 84.6-15.4 |
| Viscosity centipoises | 300 |

The product when tested in general had properties similar to those of the product of Example I, except that its heat strength was substantially higher. Its heat test value (average of three tests) was 217° F.

Example IV

This example was carried out under substantially the same temperature conditions as Example I and like Example III involves a carbon black fortifier. The synthetic rubber dispersion fed to the colloid mill in this example consisted of 66 parts of butadiene styrene copolymers containing 62½% by weight of synthetic rubber solids, 15.7 parts of sodium B rosin soap and 18.3 parts of 1.5% methyl cellulose having a viscosity of 1500 centipoises. The asphalt blend was the same as in Examples I and III, but it and the synthetic rubber dispersion were fed to the colloid mill in the proportions of 41 2 parts asphalt to 58.8 parts rubber dispersion. To 74.83 parts of the dispersion withdrawn from the colloid mill was added 9.28 parts of 3% sodium B rosin soap and 15.89 parts of a 37% dispersion of carbon black. The resultant product dispersion had the following percentage composition by weight:

| | |
|---|---|
| Asphalt | 41.16 |
| GR-S solids | 13.91 |
| Sodium B rosin soap | 1.27 |
| Methyl cellulose | .092 |
| Carbon black solids | 5.94 |
| Water | 37.628 |
| Ratio of asphalt to synthetic rubber | 75-25 |
| Viscosity centipoises | 50,000 |

The product when tested was found to be an eminently satisfactory adhesive for application by a coating roller or spray equipment having somewhat larger discharge orifices than those used for spraying the less viscous material of Examples I, II and III. The product was further found to have exceptional heat strength. Its heat test value (average of three tests) was above 413° F.; at this value all samples under test were still in bond when the tests were discontinued.

Example V

This example was carried out under the same temperature conditions as the other examples, involved the same asphalt blend, and the use of a GR-S latex of the same concentration as used in Example IV. The synthetic rubber dispersion fed to the colloid mill in this example consisted of 79.25 parts GR-S latex, 5.95 parts of sodium B rosin soap of 24% concentration and 14.80 parts of .9% methyl cellulose of a viscosity of 1500 centipoises. The asphalt was mixed with this dispersion in the proportions of 49.6 asphalt to 50.4 synthetic rubber dispersion. To 78.8 parts of the dispersion withdrawn from the colloid mill were added 4.40 parts of sodium B rosin soap 3% concentration, and 16.8 parts of a 37% dispersion of carbon black. The resultant product dispersion had the following percentage composition by weight:

| | |
|---|---|
| Asphalt | 47. |
| GR-S solids | 15.75 |
| Sodium B rosin soap | .588 |
| Methyl cellulose | .047 |
| Carbon black solids | 6.3 |
| Water | 30.315 |
| Ratio of asphalt to synthetic rubber | 75-25 |
| Viscosity centipoises | 100,000 |

This product when tested was found to be an eminently satisfactory adhesive for application by a coating roller, and to have exceptional quick breaking properties and exceptional heat strength, though its stability in contact with bimetal systems was not as high as in the case of the products of the preceding examples. Its heat test value (average of three tests) was above 413° F.; at this value all samples under test were still in bond when the tests were discontinued.

Example VI

This example differs from Example IV chiefly in that the thickening agent is incorporated in the product dispersion consisting of the synthetic rubber and asphalt dispersed in aqueous medium, instead of combining it with the synthetic rubber dispersion before mixing the asphalt therewith in the colloid mill. The synthetic dispersion fed to the colloid mill in this example consisted of 24.9 parts of GR-S latex, 5.7 parts of sodium B rosin soap of 24% concentration, and 2.48 parts of sodium B rosin soap of 3% concentration. Asphalt, consisting of the same blend as in Examples I and III, was mixed in the colloid mill with the dispersion in the proportion of 57.3 parts of the asphalt to 42.7 parts of the synthetic rubber dispersion. To 78 parts of the dispersion withdrawn from the colloid mill were added 6.65 parts of a 1.5% solution of methyl cellulose of a viscosity of 1500 centipoises, and 15.35 parts of a 37% dispersion of carbon black. The resultant product dispersion had the following composition by weight:

| | |
|---|---|
| Asphalt | 44.3 |
| GR-S solids | 15.0 |
| Sodium B rosin soap | 1.4 |
| Methyl cellulose | 0.1 |
| Carbon black solids | 6.0 |
| Water | 33.2 |
| Ratio of asphalt synthetic rubber | 75-25 |
| Viscosity_____centipoises | 75,000 |

This product when tested had properties substantially the same as those of the product made according to Example IV.

In all of the above examples dispersions of other synthetic rubbers hereinabove-mentioned may be substituted for the dispersions of GR-S. As will be understood, the differences in the properties of such other synthetic rubbers may require that suitable variations be made in the amount thereof and in the amount of added dispersing agent employed for producing a product containing the desired quantity of the selected bitumen within the range herein set forth. Thus in the case of polychloroprene, such as neoprene rubber, somewhat higher amounts of dispersing agent compatible therewith will generally be required to be incorporated in the dispersion for effecting the dispersing of bitumen in the same ratio as when employing butadiene styrene copolymer.

The pH of all the products of the above examples was within the range of 9 to 14.

The heat test is carried out by bonding test strips of felt to metal using a film of the dispersion under test. A weight of 200 grams is attached to the felt strip and the test metal strip suspended in an oven so that the weight exerts a force in a direction to pull the felt off of the metal to which it is bonded. The oven initially is at a temperature of 43° C. and is maintained at this temperature for 10 minutes. The temperature is then raised to 53° C. during a 15 minute interval and held at this temperature for 10 minutes, the temperature is thereafter raised 10° C. increments during a 10 minute interval and held at each of the succeeding 63°, 73°, 83° C., etc. points for 10 minutes. The time and temperature at which the felt separates from the metal is noted and indicates the heat strength of the material under test.

The deposition test is a measure of the stability of the dispersion in a bi-metal system, such as simulated by galvanized pipe. This test is carried out by submerging two electrodes, one a zinc and the other an iron electrode, and each an inch wide, 2 inches deep in a body of the material under test, the electrodes being placed one inch apart. An electromotive force of 6 volts is passed across the electrodes for 10 minutes and the weight of material in grams deposited on the submerged portion of the electrodes then determined.

Penetration values given herein are determined by A. S. T. M. test D-5-25 at 77° F.

It will be noted this invention provides a dispersion of bitumen, particularly asphalt and rubber, in an aqueous medium suitable for adhesive uses in the automotive and other industries, which adhesive possesses excellent tack, tack retention and high heat strengths and which dispersion is stable in storage and when flowing through pipe lines, possesses excellent sprayability characteristics and is quick breaking in use. It will be further noted the process of this invention involving as it does continuous flow of streams of synthetic rubber dispersion and bitumen into and through a colloid mill or other analogous mixing zone results in large through puts per unit of time and equipment with consequent economy in the cost of producing the product.

Since certain changes may be made in the invention without departing from the scope thereof, it is intended that all matter contained in the above description shall be interpreted as illustrative and not in a limiting sense.

What is claimed is:

1. An adhesive consisting of a dispersion of synthetic rubber from the group consisting of butadiene styrene copolymers, butadiene acrylonitrile copolymers, polychloroprenes, and rubbery organic polysulfides and bitumen in an aqueous medium, said dispersion having a pH of from 9 to 14, containing from 1 to 9 parts of bitumen having a melting point from 85° to 160° F. and a penetration of from 30 to 200 for each part of synthetic rubber, said synthetic rubber being produced by polymerizing the synthetic rubber forming reactants in the presence of a soap dispersing agent, and said dispersion containing a small but effective amount of a dispersing agent compatible with the said soap dispersing agent.

2. An adhesive consisting of a dispersion of a butadiene styrene copolymer and bitumen in an aqueous medium, said dispersion having a pH of from 9 to 14, containing from 1 to 9 parts of bitumen having a melting point of from 85° to 160° F. and a penetration of from 30 to 200 for each part of butadiene styrene copolymer, said copolymer being produced by polymerizing the butadiene and styrene in the presence of a soap dispersing agent, said dispersion containing a small but effective amount of an added dispersing agent compatible with said soap dispersing agent and having a viscosity of from 100 to 150,000 centipoises.

3. An adhesive consisting of a dispersion of a butadiene styrene copolymer and asphalt in an aqueous medium, said dispersion having a pH of from 9 to 14, containing from 1 to 9 parts of of asphalt having a melting point of from 85° to 160° F. and a penetration of from 30 to 200 for each part of butadiene styrene copolymer, said copolymer being produced by polymerizing the butadiene and styrene in the presence of a soap dispersing agent, said dispersion containing a small but effective amount of an added dispersing agent compatible with said soap dispersing agent and small but effective amounts of a thickener such that the dispersion has a viscosity of 100 to 150,000 centipoises.

4. An adhesive consisting of a dispersion of butadiene styrene copolymer and asphalt in an aqueous medium, said dispersion having a pH of from 9 to 14, containing from 1 to 9 parts of asphalt having a melting point of from 85° to 160° F. and a penetration of from 30 to 200 for each part of butadiene styrene copolymer, said copolymer being produced by polymerizing the butadiene and styrene in the presence of soap emulsifying agent, small but effective amounts of a thickener and soap, and water in amount such that the dispersion has a viscosity of 100 to 150,000 centipoises.

5. An adhesive consisting of an aqueous dispersion of butadiene styrene copolymer and asphalt having a melting point of 85° to 160° F. and a penetration of 30 to 200 in the proportion of from 70 to 85 parts asphalt per from 15 to 30 parts butadiene styrene copolymer, said copolymer being produced by polymerizing the butadiene and styrene in the presence of soap, said dispersion having incorporated therein from .5% to 2.5% by weight of soap based on the weight of said dispersion, from .0025% to 1% by weight of thickening agent based on the weight of solids in said dispersion, and having a viscosity of from 100 to 150,000 centipoises.

6. A product as defined in claim 5, in which the thickening agent is methyl cellulose and the amount of methyl cellulose is from .01% to .3% by weight based on the weight of solids in said dispersion.

7. An adhesive consisting of an aqueous dispersion of butadiene styrene copolymer and asphalt having a melting point of 85° to 160° F. and a penetration of 30 to 200 in the proportion of 85 parts asphalt and 15 parts butadiene styrene copolymer, said copolymer being produced by polymerizing the butadiene and styrene in the presence of soap, said dispersion having incorporated therein from .5% to 2.5% by weight of soap based on the weight of said dispersion, from 0.01% to 0.3% by weight of thickening agent based on the weight of solids in said dispersion, and having a viscosity of from 100 to 350 centipoises.

8. A process of making an adhesive composition in dispersion form which comprises feeding a stream of a dispersion of synthetic rubber particles from the group consisting of butadiene styrene copolymers, butadiene acrylonitrile copolymers, polychloroprenes, and rubbery organic polysulfides in an aqueous medium into a mixing zone, the synthetic rubber particles being produced by polymerizing the rubber forming reactants dispersed in an aqueous medium containing a soap dispersing agent, said dispersion having incorporated therein a dispersing agent compatible with the first-named dispersing agent, said stream containing from 18% to 55% by weight of rubber solids and from 45% to 82% water and having a pH of from 10.5 to 14, feeding into said zone a stream of liquid bitumen having a melting point of from 85° to 160° F. and a penetration of from 30 to 200, the amount of each of said streams introduced into said zone being such that the resultant mixture contains from 1 to 9 parts of bitumen for each part of said synthetic rubber solids, intimately mixing the two streams as they flow through said zone, continuously withdrawing from said zone the resultant mixture, and maintaining the pH of said mixture within the range of 9 to 14.

9. A process of making an adhesive composition in dispersion form which comprises feeding a stream consisting of a dispersion of butadiene styrene copolymers in an aqueous medium containing an added soap dispersing agent into a colloid mill, the butadiene styrene copolymers being produced by polymerizing the styrene and butadiene dispersed in an aqueous medium containing a soap dispersing agent, said stream containing from 18% to 55% by weight of rubber solids and from 45% to 82% water and having a pH of from 10.5 to 14, feeding into said mill a stream of liquid bitumen having a melting point of from 85° to 160° F. and a penetration of from 30 to 200, the amount of each of said streams introduced into said mill being such that the resultant mixture contains from 1 to 9 parts bitumen for each part of butadiene styrene copolymer, intimately mixing the two streams as they flow through said mill, continuously withdrawing the resultant mixture from said mill, and maintaining the pH of said mixture within the range of 9 to 14.

10. A process as defined in claim 9, in which the bitumen is asphalt and a small but effective amount of a thickening agent is added to the dispersion of butadiene styrene copolymer prior to its introduction into the colloid mill.

11. A process as defined in claim 9, in which the bitumen is asphalt and a small but effective amount of a thickening agent is added to the mixture withdrawn from said mill.

12. A process as defined in claim 9, in which the bitumen is asphalt, and not less than about 1% by weight of soap dispersing agent based on the weight of the dispersion of butadiene styrene copolymers is incorporated in said dispersion.

13. A process as defined in claim 12, in which from .01% to .3% by weight of methyl cellulose based on the total weight of solids in said dispersion is incorporated in the mixture withdrawn from said mill.

14. A process of making an adhesive composition in dispersion form which comprises feeding a stream consisting of a dispersion of butadiene styrene copolymers in an aqueous medium into a colloid mill, the butadiene styrene copolymers being produced by polymerizing the styrene and butadiene dispersed in an aqueous medium containing soap and said dispersion of the butadiene styrene copolymers having incorporated therein not less than about 1% by weight of a dispersing agent compatible with said soap, said stream containing from 18% to 55% by weight of rubber solids and from 45% to 82% water and having a pH of from 10.5 to 14, feeding into said mill a stream of liquid bitumen having a melting point of from 85° to 160° F. and a penetration of from 30 to 200, the amount of each of said streams introduced into said mill being such that the resultant mixture contains from 1 to 9 parts bitumen for each part of butadiene styrene copolymer, intimately mixing the two streams as they flow through said mill, continuously withdrawing the resultant mixture from said mill, maintaining the pH of said mixture within the range of 9 to 14, and adjusting the viscosity of the mixture withdrawn from said mill to a viscosity of from 100 to 150,000 centipoises.

CHARLES A. LANKAU.
ROBERT E. LEEKS.
CLEMENT L. MARINO.

REFERENCES CITED

The following references are of record in the file of this patent:

UNITED STATES PATENTS

| Number | Name | Date |
|---|---|---|
| 1,831,226 | Byrd | Nov. 10, 1931 |
| 2,288,293 | Metcalf | June 30, 1942 |
| 2,453,880 | Vanderbilt et al. | Nov. 16, 1948 |
| 2,506,339 | Buckley et al. | May 2, 1950 |

FOREIGN PATENTS

| Number | Country | Date |
|---|---|---|
| 489,847 | Great Britain | Aug. 4, 1938 |

Certificate of Correction

Patent No. 2,537,190 January 9, 1951

CHARLES A. LANKAU ET AL.

It is hereby certified that error appears in the printed specification of the above numbered patent requiring correction as follows:

Column 1, line 44, for the word "of" read *or*; column 7, line 64, for "41 2" read *41.2*; column 8, line 65, before "dispersion" insert *rubber*; column 10, line 47, after "parts" strike out "of"; column 11, line 37, for "rnubber" read *rubber*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*